July 27, 1954  J. MADER  2,684,740
DRIVING MECHANISM AND CONTROLS THEREFOR
Filed March 15, 1949  2 Sheets-Sheet 1
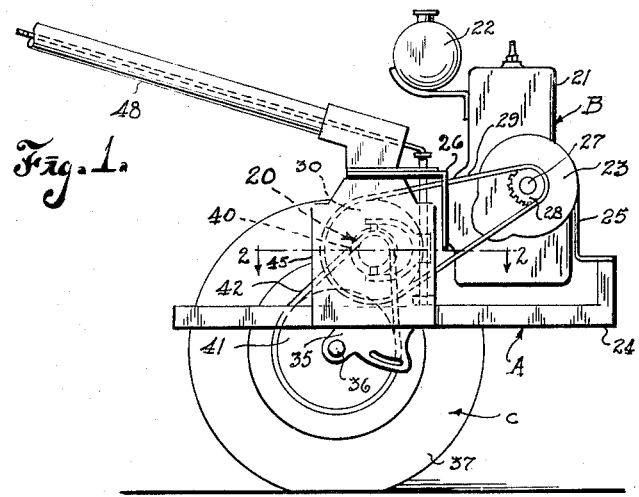
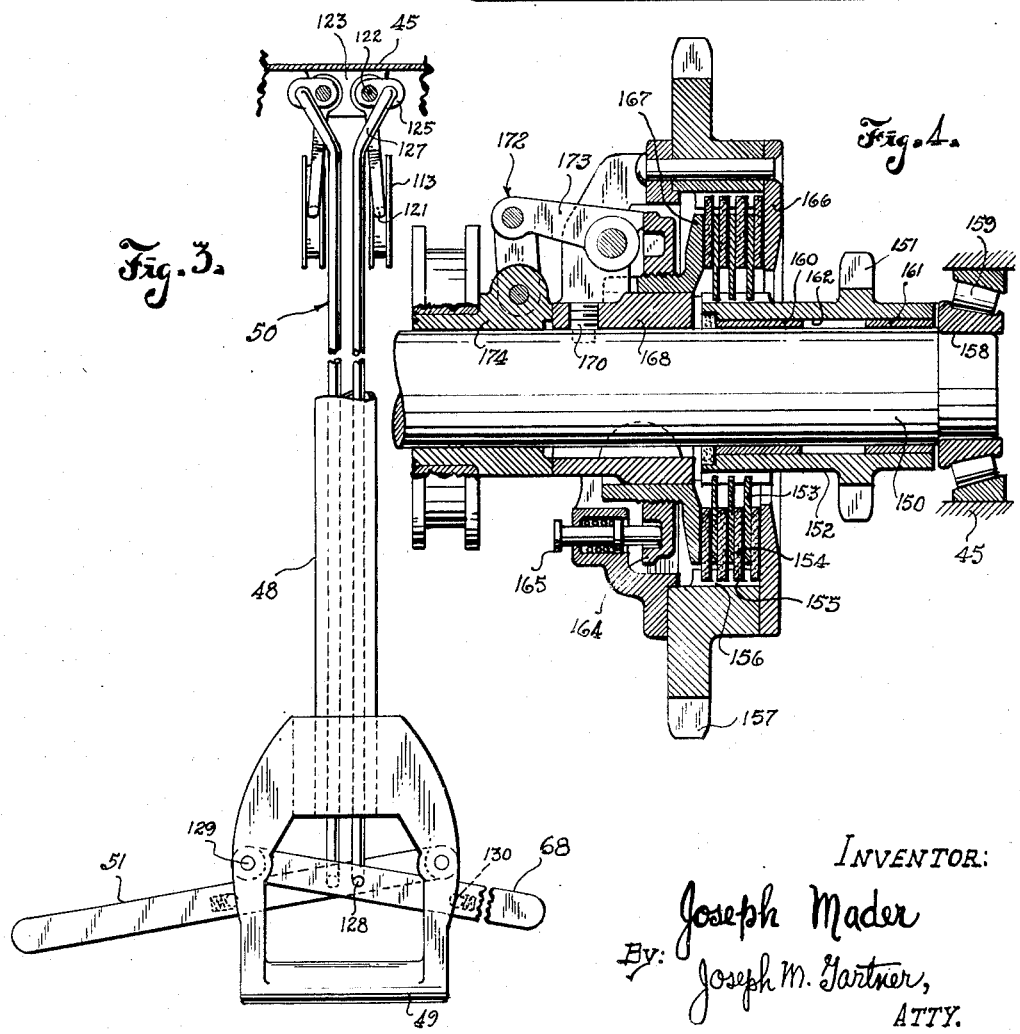
INVENTOR:
Joseph Mader
By: Joseph M. Gartner,
ATTY.

Patented July 27, 1954

2,684,740

UNITED STATES PATENT OFFICE 2,684,740

DRIVING MECHANISM AND CONTROLS THEREFOR

Joseph Mader, Berwyn, Ill.

Application March 15, 1949, Serial No. 81,526

3 Claims. (Cl. 192—49)

This invention relates in general to driving mechanisms and controls therefor adaptable for employment in hand-operated tractors, and is more particularly concerned with friction clutches and controls therefor in which independently rotatable driven members are coupled with each other by a plurality of friction discs when these discs are brought into frictional cooperation by clutching means which include backing and clamping plates for the discs and means for shifting the plates into clamping and releasing positions.

Heretofore, in driving mechanisms and controls therefor employed in motor driven hand-operated tractors, the elements thereof comprised elaborate and expensive clutching means to advantageously accomplish the steering and operation of the tractor. In these prior art structures various methods have been employed to overcome the apparent difficulties encountered in the efficient operation and maintenance of the tractors on which the elements and principles of operation of the present invention may advantageously be employed. For example, maintenance problems presented a challenge to the ingenuity of the designers in that hand-operated tractors necessitated a simple and efficient means for access to the driving mechanism and convenient means for removing the driving mechanism from the tractor proper for maintenance and repair purposes. In the prior art structures the question of efficient steering and easy handling of the hand-operated tractor presented a further problem.

It is recognized that in the prior art numerous attempts have been made to provide for motor driven hand-operated tractors a suitable driving mechanism and controls therefor of this general class to overcome the various deficiencies found in such prior art constructions, but to the best of the applicant's knowledge the prior art structures have had only limited success, and have been accorded only limited commercial recognition. It is believed that this fact results from deficiencies of the prior art structures, their non-adaptability for universal application and their expensive construction which so greatly increased the cost as to seriously handicap sales acceptance.

The present improvement in driving mechanisms and controls therefor for hand-operated tractors is directed to simplify their construction and their mode of operation, and also to provide a driving mechanism and controls therefor which may be readily and conveniently employed universally to the various hand-operated tractors on the market. Moreover, the present device seeks to employ conventional parts wherever necessary and possible, thereby to effect a reduction in the cost over the prevailing types of driving mechanisms presently employed.

Accordingly, a general object and accomplishment of the invention is to provide a clutch mechanism especially designed for motor driven hand-guided tractors, which is of simple but sturdy construction and conveniently operated.

A further object and accomplishment of the invention is to provide a driving mechanism and controls therefor which are particularly characterized in the arrangement of the contemplated device with respect to the handle bars of the tractor so that the tractor may be conveniently guided and its actions easily controlled under all conditions due to variations in the contour of the ground over which the tractor is run.

A further object and accomplishment is to provide a driving mechanism as contemplated herein employing principles whereby an adjusting ring carries a lock pin which is adapted for locking engagement with one of the clamping rings of the clutch, and in which the locking pin is further conditioned for retraction to permit a repositioning of the adjusting ring.

It is a more particular object and accomplishment of the invention to provide a clutch of the plate type which is mechanically engaged by a control operating mechanism that tends to release under the impulse of centrifugal force, thus insuring that the clutch will run free in the disengaged position.

A further object is the provision of a compact clutch structure having an adequate mechanical advantage in the control and operating mechanism for insuring the application of the required clamping pressure, ease of adjustment as the plates wear, and a positive release of the clutch levers or arms during disengagement.

A more detailed object and accomplishment of the invention is the provision of a friction clutch having a fixed backing plate, an adjustable clamping plate and mechanism adjacent to the clamping plate adapted to adjust its position for compensating wear and tear of the friction elements of the clutch, such mechanism including actuating means associated with the clamping plate to facilitate actuation of such mechanism without disassembly of the clutch.

A further object and accomplishment of the invention is to provide a driving mechanism and controls therefor as contemplated herein and by which the friction discs are effectively placed into engagement, is adjustable so as to take up wear, and is arranged to apply just the right amount of force to hold the friction discs firmly together when placed into engagement.

Another important object of my invention is to provide independent clutch mechanisms and controls therefor for each driving wheel of the tractor so that the power of the motor may be advantageously applied to either driving wheel separately and thus facilitate the steering of the tractor.

A still further object and accomplishment of the invention is to provide a clutch structure which may be advantageously employed on tractors especially where restricted dimensional areas are only available, the contemplated clutch structure facilitating power turning and having an important feature in that all clamping pressures are confined within the body of the clutch which provides advantages of reduced space.

The invention seeks, as a final object and accomplishment, to provide a driving mechanism and controls therefor as contemplated herein and characterized by an arrangement of parts to more advantageously and satisfactorily perform the function required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described and, as more particularly pointed out in the appended claims.

With the above and other incidental objects in view, the invention has other marked improvements and superiorities which radially distinguish it from presently known structures, these improvements in the invention residing in the novel construction and cooperative function of the parts thereof, the combinations of the parts, and the arrangement thereof as illustrated in the drawing and which will be more fully described hereinafter and particularly pointed out in the claims.

In the accompanying drawings on which there are shown various embodiments of the invention, Fig. 1 is a side elevational view of one form of a power driven hand-operated tractor with which the driving mechanism and controls therefor may be advantageously employed, this view illustrating the relative disposition of the elements of the driving mechanism contemplated herein with respect to the various component parts of the tractor proper, and having the wheel at the near side thereof removed so that the parts thereof may be more clearly shown;

Fig. 3 is a top plan view illustrating the relative disposition of the elements of the clutch control mechanism contemplated by this invention; and Fig. 4 is a fragmentary sectional view of a modified clutch mechanism embodying features contemplated by this invention.

The drawings are to be understood as being more or less of a schematic character for the purpose of illustrating and disclosing typical or preferred forms of the improvements contemplated herein and in the drawings like reference characters identify the same parts in the several views.

Figure 2:
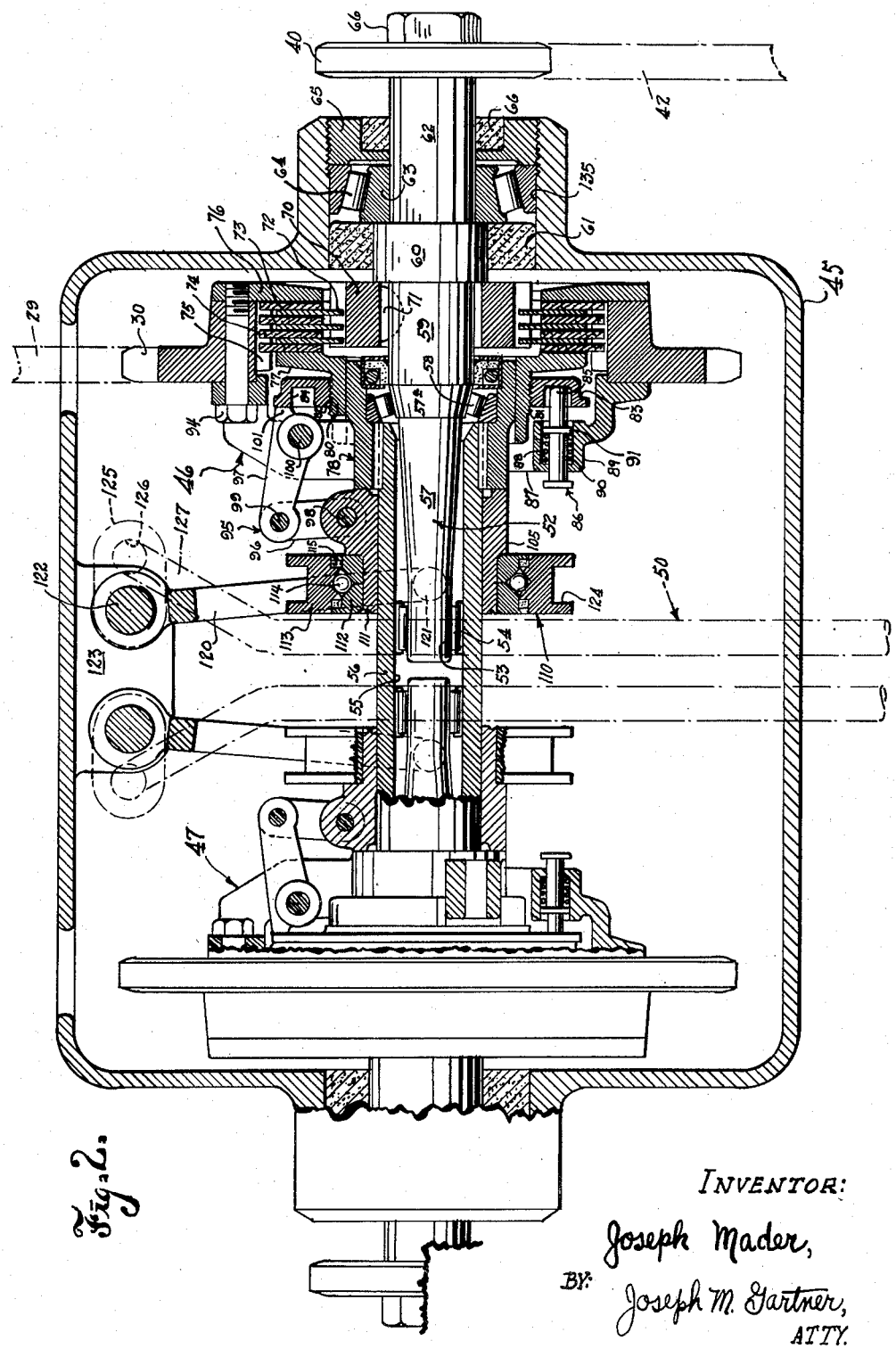
Fig. 2 is a plan elevational view of a driving mechanism embodying the features contemplated by this invention, this view being taken substantially on the plane of the line 2—2 in Fig. 1 and having portions thereof shown in section to more clearly illustrate the construction of the various parts thereof.

As one possible example of advantageous employment of the contemplated driving mechanism and controls therefor reference is made to the drawings, particularly Fig. 1, wherein there is illustrated the driving mechanism and controls therefor with which the invention is particularly concerned and designated in its entirety by the numeral 20 as being operatively associated with a conventional motor driven hand-operated tractor designated in its entirety by the letter A, said driving mechanism and controls therefor being adjunctively employed, for example, between a conventional motor or power unit assembly designated in its entirety by the letter B, and an axle and wheel assembly designated in its entirety by the letter C.

The illustrated motor or power mechanism C may comprise a conventional gasoline engine 21 having a suitable gasoline tank 22 mounted in any convenient manner to the motor block, said motor 21 having a suitable transmission or gear reduction unit 23, and the motor proper being operatively disposed on and carried by a suitable frame 24 by means of brackets as at 25 and 26.

Carried by a stub shaft 27 of the transmission 23 is a sprocket 28 arranged to carry a suitable chain 29 which is arranged to ride upon and transmit power to sprocket portions 30 forming a part of the clutch structure of the driving mechanism contemplated herein, thereby provide a source of power to said driving mechanism.

The illustrated axle and wheel assembly may comprise an adjustable hub portion 35 arranged to carry a shaft 36 upon which the wheel and tire assembly 37 is journaled for effective and relative rotation therebetween.

Operatively disposed between the driving mechanism 20 and the axle and wheel assembly C there is a power transmitting mechanism comprising a sprocket 40 operatively associated with the driving mechanism 20, a sprocket 41 operatively associated with the axle and wheel assembly, and preferably a suitable chain 42 arranged to ride upon the aforementioned sprockets 40 and 41, thereby to effectively and efficiently transmit power from the driving mechanism 20 to the wheel assembly 37.

A review of the drawings will disclose that there are two driving mediums disposed between the driving mechanism 20 and the axle and wheel assembly 37, one driving arrangement being operatively associated with each wheel so that either one or the other or both of the wheel assemblies may be selectively caused to rotate or be stopped for the purpose of steering the tractor.

Suffice it to say, since the invention is not particularly concerned with the precise construction of the illustrated power hand-operated tractor and/or its associated parts, they will not be further described in detail, and it is deemed sufficient for all intentions and purposes herein contained to show only portions thereof adjacent to and cooperating with the driving mechanism and controls therefor contemplated herein. It is to be understood that details of construction of such power hand-operated tractors and/or their associated parts may be modified to suit particular conditions or to satisfy the engineering genius of various competitive manufacturers and in some instances the contemplated driving mechanism and controls therefor may be advantageously employed in other types of power operated vehicles, and I do not wish to be limited to the construction of these elements as set forth except where such construction particularly concerns the invention contemplated herein.

Having thus described, by way of example, a possible adaptation of the driving mechanism and controls therefor generally indicated at 20 and as contemplated herein, and having described the general environment surrounding the adaptation, the specific construction and cooperative functions of the parts of said driving mechanism and controls therefor with which the present invention is particularly concerned, will now be described in detail.

In the exemplary embodiment of the invention depicted in Figs. 1, 2 and 3, the drive mechanism 20 and controls therefor with which the present invention is particularly concerned comprises, in general, a housing 45 operatively associated with the tractor frame 24 and arranged to substantially enclose the driving mechanism as illustrated in Fig. 2, a first clutch assembly designated in its entirety by the numeral 46 and operatively disposed within the housing 45 and having as a component part thereof the sprocket element 30 which is arranged in driving association with the motor B through the medium of the chain 29 and the sprocket element 28 as shown in Fig. 1, a second clutch assembly designated in its entirety by the numeral 47 and also being operatively disposed within the housing 45 and being arranged to facilitate the operation of a wheel assembly opposite to that being operated by the clutch mechanism 46, and controls respectively facilitating the operation of the clutch assemblies 46 and 47, and designated in their entirety by the numeral 50, said controls being arranged in a handle 48 having one end thereof secured to the upper portions of the housing 45 and having a hand grip 49 disposed at the other end thereof, said controls 50 including a clutch operating lever 51 interconnected to the clutch assembly 47 and a clutch operating lever 68 interconnected with the clutch assembly 46, whereby the operations of the respective clutch assemblies may be controlled so that either one or the other or both may be caused to operate to facilitate driving and steering of the tractor.

In referring more particularly to Fig. 2, it may be stated that the clutch assemblies 46 and 47 are identical in construction, therefore, it is deemed expeditious to merely describe in detail one of such clutch structures. Accordingly, the clutch assembly 46 has been selected since portions thereof are shown in section to more clearly illustrate the construction thereof.

Referring to Fig. 2, wherein the driven member constitutes a shaft designated in its entirety by the numeral 52, the driven member has a narrowed portion 53 formed to define a race for needle bearings 54 which are carried by the internal bore 55 of a rotatable sleeve member 56. The driven shaft 52 is provided with a tapered portion 57 and following the tapered portion there is provided an angularly disposed race 57a for a suitable roller bearing assembly 58 and following the race 57a there is provided an elongated section 59 followed by a flanged portion 60 arranged to provide a sealing surface for the seal means 61, said flange portion being followed by an elongated portion 62 arranged to receive the inner race 63 of a suitable roller bearing 64, and the retaining ring 65 which is provided with seal means as at 66.

As illustrated in Fig. 2, the outer end portions of the driven shaft 52 have operatively associated therewith the sprocket member 40 which may be advantageously secured to the driven shaft 52 by means of the nut 66.

The clutch assembly 46 is provided with a hub 70 secured to portions 59 of the driven member 52 as, for example, by means of the key 71, said hub 70 being arranged to carry for axial movement with respect thereto one or more friction driven discs as at 72. These friction discs are alternately disposed with respect to one or more friction driving discs 73 which are illustrated as having their toothed peripheries 74 arranged in driving engagement with the toothed flange portions 75 of the sprocket 30.

Although a multiple disc clutch has been described and set forth in the drawings by way of illustration, it is obvious that in some applications single discs may be advantageously employed. Moreover, the number of discs to be employed may be determined and dependent upon the load required and the characteristics of the services to be rendered.

The thus related sets of friction driven discs 73 and the friction driving discs 72 are forced into frictional driving engagement by a pair of clamping members embodying a backing plate 76 carried by the sprocket member 30 and a clamping or pressure plate 77 carried by a hub 78 and axially shiftably arranged with respect thereto. These clamping members, backing plate 76 of which constitutes a fixed abutment, engage the assembly of discs 72 and 73 at its opposite sides and effect frictional driving engagement between these discs when the clamping or pressure plate 77 is shifted by a clutch actuating mechanism to be hereinafter described.

In addition to serving as a clamping member for the two groups of discs hereinbefore described, the pressure plate 77 is provided with means to maintain the said plate in a fixed adjusted position so as to provide an effective and advantageous adjustment of the pressure plate 77, which adjustments are necessitated from time to time due to wear of the two groups of discs.

The adjusting means for the pressure plate 77 is an important feature of the present invention. To this end, the pressure plate 77 is provided with a flanged portion 80 having threaded formations 81 arranged to accommodate threaded formations 82 disposed on an annular ring member 83 provided with a plurality of circumferentially disposed apertures 84 which are preferably equi-spaced around the annulus of the ring member 83. These apertures are intended to receive end portions 85 of a lock pin 86 which is carried by a retainer member 87 having a cavity 88 provided in a hub portion 89.

The lock pin 86 is shiftable in a direction axially of the shaft 52 and is spring pressed by the medium of a spring 90, operatively disposed within the cavity 88, and having one end thereof abutting end portions of the cavity, thereby to restrict outward movement thereof, and, the other end of the spring being abutted against a shoulder 91 operatively associated with the lock pin, thereby to urge the lock pin in a direction so that the end portions 85 thereof will be received into one of the apertures 84 disposed in the ring member 83 to restrict relative rotation between the retainer member 87 and the ring member 83.

It can be seen that when the lock pin is pulled so that the end portions 85 are removed from the apertures 84, the ring member 83 may be rotated, and, because of the cooperating threaded formations 81 and 82, the ring member will be caused to move axially in either direction with respect to the hub portion 80 of the clamping member 77, thereby to effect adjustment of the final clamping pressure of the pressure plate 77.

It is notable that the retaining member 87 may be secured to portions of the sprocket 30 by any convenient means, and, as an example thereof, there is illustrated the bolt 94 which, as can be seen in Fig. 2, also effects securement of the clamping plate 76 to the sprocket portion 30.

As the friction discs 72 and 73 wear, it becomes necessary to readjust the initial position of the pressure plate 77, owing to the effective range of movement of the rocker arms designated in their entirety by the numeral 95 and to be hereinafter more fully described. This adjustment is effected by means of the ring member 83 which may be rotated in the correct direction after pulling out the lock pin as hereinbefore described, thereby to move axially the ring member 83 by hand or by the insertion of a suitable tool in one of the apertures 84.

As a means of actuating the clutch parts to driving position, there is provided a plurality of rocker arms as at 95 which may comprise two legs 96 and 97 which are secured together for pivotal movement, with respect to each other, by the pins 98, 99 and 100. The arm 97 is provided with an abutment 101 arranged to be in intimate contact with a portion of the adjustment ring 83 as shown in Fig. 2, whereby the reaction of the movement of the arms 96 and 97 will be translated to the adjustment ring 83 to cause movement of the clamping member 77 for drivingly engaging the friction discs. It is notable that the pin 100 is carried by the retainer ring member 87 providing a pivot point for the arm 97 while the other end of the combined rocker arms is provided with a pivot pin 98 carried by a hub 105 which is axially slidably mounted on the sleeve member 56.

Operatively associated with the hub 105 there is provided a shifter ring member, designated in its entirety by the numeral 110 and forming another important feature of the present invention. In Fig. 2 it can be seen that the hub member 105 is provided with a crimp 111 which, in effect, secures portions of the shifter ring to the hub and prevents relative rotation therebetween.

It can be seen that the shifter ring member 110 is comprised of an inner race 112 which may be formed of two separate parts as shown, and an outer ring member 113, said inner race 112 and said outer ring member 113 having operatively disposed therebetween suitable ball bearings 114 so that the inner race members 112 may rotate with the hub 105 and permit the outer ring 113 to maintain a relatively stationary position which will, in effect, reduce and eliminate friction in the operation of the clutch.

In order that the ball bearings 114 may be effectively lubricated and the lubricant be retained in its proper position there is provided sealing means 115.

In order to accomplish axial movement of the hub 105 which, in effect, translates movement of the arms 96 and 97 which, by virtue of being operatively associated with the adjustable ring member 83, accomplishes the positioning of the pressure plate 77 in proper driving relationship so as to effectively clamp the discs 72 and 73 between a face of the clamping member 77 and a face of the clamping member 76, thereby to effect the rotation of the driven shaft, there is provided a shifter yoke 120 having end portions 121 operatively associated with the outer ring member 113 and having opposite end portions fixedly secured to a vertically disposed shaft 122 journaled in a support plate 123 integral with the housing 45. It can be seen that the outer ring member 113 is provided with a circumferential groove 124 and in this groove are pins forming a part of the end portion 121 of the shifter yoke member 120.

Carried by the upper portions of the shaft 122 there is a crank arm 125 which is provided with an aperture 126 arranged to receive end portions of an operating rod 127, which operating rod is provided with bend portions (Figs. 2 and 3) adjacent the end thereof so that the balance of the rod 127 may travel on the inside of the tubular shaped handle 48 and up to the operating lever 68 where end portions 128 are advantageously connected to the operating lever 68. In referring to Fig. 3 it can be seen that the operating lever 68 is provided with a pivot 129 and a spring pressed ball type lock 130, said pivot permitting movement of the operating arm in both directions to translate selective movement therein down to the shifter yoke thereby to operate the clutch mechanism.

It is notable that the hand-grip assembly disposed at the top end of the tubular handle 48 may be advantageously formed by casting or by any other convenient means to provide two like parts which may be placed upon each other to define the hand-grip 49 as illustrated. Moreover, attention is invited to the fact that the clutch operating lever 68 and the clutch operating lever 51 respectively move on different planes so that the mechanisms associated therewith may bypass each other without coming into contact.

In referring to Figs. 2 and 3, it can be seen that the controls for the clutch members 46 and 47 are identical, and therefore it is being expeditious to merely describe one of such controls.

It is apparent from the construction thus far explained that the operator can advantageously move either of the operating levers 51 or 68, thereby to accomplish selective operation of either one or both of the clutch assemblies 46 and 47. It is preferable that the forward movement of the operating levers will cause engagement of the clutch to effect driving rotation of the wheel assemblies, and, a rearwardly movement of the operating lever will effect a disengagement of the clutch. This is important because when the operator is walking along with tractor and if the tractor should increase its speed, or, for any other reason the operator should lag behind, the drag of his body would cause the movement of the lever arms 51 and 68 rearwardly and thereby disengage the clutches. This safety feature is also important in the event that the operator should stumble or fall.

When the tractor is in a standing position, the operator will only have to walk forwardly and in doing so will cause the operating levers 51 and 68 to be moved forwardly which will engage the clutches simultaneously thereby causing the tractor to move in a forwardly direction.

A particular advantage of this construction is that the operator may effectively and advantageously steer the tractor by merely operating either one or the other of the operating levers 51 and 68. For example, in the event the operator desired to make a right-hand turn he would pull the operating lever 68 in a rearward direction which would disengage the right-hand clutch while the left-hand clutch would be still engaged, thereby to effectively cause a power turning of the tractor with the right-hand wheel acting as a pivot. This power turning feature is very important in that there is never a lapse in the pull of the tractor even though the tractor is being turned away from a straight path.

As previously mentioned, even though a heavy load is being pulled by the tractor, only very slight exertion is all that is ever required on the part of the operator to throw in or out the friction clutch assemblies 46 and 47 through the media of the hand-operating levers 51 and 68 with ample power to prevent any slippage between the clutch discs. Furthermore, in the clutch mechanism contemplated herein gear shifts and other elaborate transmission elements are entirely dispensed with.

Attention is invited to Fig. 3 wherein there is disclosed a single pipe-like handle member 48 in which there is disposed the operating rods 127, it is obvious that, in some specific arrangements, two handles may be employed. In such a case it may be advantageous to have one rod as at 127 disposed in one of said handles while the other rod is disposed in the other handle. The hand grip 49 provides an additional means whereby the operator may grip the end portions of the handle to move the same in a sidewise direction very slightly to assist in maneuvering the tractor over rough ground and in and out furrows and the like.

It is apparent from the description thus far that the contemplated clutch structure only requires a minimum of space and may be assembled as a compact unit and is readily adapted for employment in any of the conventional motor driven hand-operated tractors. Heretofore, driving mechanisms and controls therefor employed in hand-operated tractors comprised elaborate and expensive transmissions to advantageously accomplish the steering and operation of the tractor. In these prior art structures, maintenance problems presented a challenge to the ingenuity of the designers in that hand-operated tractors necessitated a simple and efficient means for access to the driving mechanism and convenient means for removing the driving mechanism from the tractor proper for maintenance and repair purposes.

It is notable that in the contemplated driving mechanism and controls therefor the chain drives may be removed conveniently and quickly from the sprockets and thereafter the entire housing 45 which contains the clutching mechanisms 46 and 47 may be conveniently removed from the frame 24 and taken into a shop for convenient work thereon. Moreover, the clutch mechanisms disposed within the housing 45 may be relatively quickly and conveniently removed therefrom for repair or replacement purposes. This is advantageously accomplished by merely removing the retainer ring 65 from its operative position as shown in Fig. 2 which will expose the bearing 64 and permit removal of the driven shaft 52 from its operative position disposed within the sleeve member 56. Since the friction discs 72 are carried by the hub 70 for axial movement with respect thereto, the hub 70, because of its being keyed to the driven shaft 52 by virtue of the key 71, will come out of the opening 135 of the housing 45 with the driven member 52. The left-hand driven member may also be removed in like manner. After both of the driven members are removed, it is apparent that the remaining clutch structures, with respect to the clutch assemblies 46 and 47, may be removed from the housing. It is notable that the reassembly of the clutch mechanism may also be conveniently accomplished by merely reversing the procedure hereinbefore recited.

In adverting to Fig. 4 wherein there is shown a modified clutch structure very similar in operation to the clutch structures hereinbefore described but employing a single driven shaft as at 150 as contrasted with the two driven shafts hereinbefore described with respect to the clutch structures illustrated in Fig. 2.

In Fig. 4 the sprocket member 151 which is comparable to the sprocket member 40 associated with the construction in Fig. 2, is formed as a portion of a hub member 152 arranged to carry for axial movement with respect thereto a plurality of friction discs 153. These friction discs are alternately disposed with respect to a plurality of friction discs 154 which have their toothed peripheries 155 arranged in driving engagement with the toothed flanged portion 156 of a sprocket 157 which is comparable to the sprocket 30 with respect to the clutch structures illustrated in Fig. 2.

The driven member comprises a relatively straight shaft having at the end portions thereof a reduced portion 158 arranged to carry a suitable roller bearing 159 which is operatively associated with portions of the housing 45. Suitable bearings 160 and 161 are provided between the driven member 150 and the internal bore 162 of the hub 152.

It can be seen that the modified clutch structure illustrated in Fig. 4 is provided with an adjustable ring 164 similar to that as indicated by the numeral 83 with respect to the structure in Fig. 2. Moreover, there is provided a lock pin 165 which also performs the same function as the locking pin 86.

It is notable that the related sets of friction driven discs 153 and 154 are forced into frictional driving engagement by a pair of clamping members embodying a backing plate 166 carried by the sprocket member 157 and a clamping or pressure plate 167 carried by a hub 168 and axially shiftably arranged with respect thereto, said hub 168 being secured to the driven member 150 by means of a suitable lock screw 170 to prevent relative rotation therebetween. The clamping members 167 and 166 engage the assembly of discs 153 and 154 at its opposite sides and effect frictional driving engagement between these discs when the clamping or pressure plate 167 is shifted by the actuating mechanism designated in its entirety by the numeral 172 which comprises the rocker arms 173 which are operatively associated with a shifter member 174 axially movable with respect to the driven member 150 by virtue of the controls hereinbefore described with respect to the clutching mechanism disclosed in Fig. 2.

Thus it can be seen that when the shifter member 174 is caused to move into its clutch applying position, the movement is translated to the rocker arms 173 to the adjustable ring 164 and thereafter to the clamping plate 167 which causes movement of the friction discs 153 and 154 into driving engagement therebetween, thereby to effect relative rotation to the sprocket 151 which rotation will be translated to the wheel assembly by virtue of the chain drive as disclosed.

The main difference between the structure as disclosed in Figs. 2 and 4, is that the driven member 52 of the clutch assemblies disclosed in Fig. 2 does not rotate until the clutches are in their operating position. It is to be understood that when the clutches as illustrated in Fig. 2 are in their disengaged position all of the parts thereof will rotate including the sleeve 56 as long as the motor B is in operation with the exception of the driven member 52 and the friction discs associated therewith and the ring member 113 associated with the shifter yoke. When the clutch is applied the driven member will be caused to rotate with the elements hereinbefore described.

In the clutch structure in Fig 4, when the clutch is in its disengaged position, all of the proponent parts thereof including the driven shaft 150 will rotate. When the clutch is applied the hub 152 having the sprocket 151 will be caused to rotate with the elements hereinbefore mentioned.

From the foregoing disclosures, it may be observed that I have provided an improved driving mechanism and controls therefor for motor driven hand-operated tractors which effectively fulfills the objects thereof and provides numerous advantages which may be summarized as follows:

1. Structurally simple, efficient and durable;
2. Economical to manufacture and readily adaptable to mass production manufacturing principles; and
3. The provision of a driving mechanism and controls therefor which may be advantageously employed on tractors especially where restricted dimensional areas are only available, and the contemplated structure facilitating power turning and having an important feature in that all clamping pressures are confined within the body of the clutch which provides advantages of reduced space.

While I have illustrated preferred embodiments of my invention, many modifications may be made without departing from the spirit of the invention, and I do not wish to be limited to the precise details of construction set forth, but wish to avail myself of all changes within the scope of the appended claims.

I claim:

1. In a driving mechanism and control therefor including a housing to substantially enclose said driving mechanism: means defining a rotatable sleeve shaft, means defining a first disc-type clutch assembly having driving and driven elements, means defining a second disc type clutch assembly having driving and driven elements, the driving elements of the respective clutch assemblies being fixedly mounted on said sleeve shaft in axially spaced relationship adjacent opposite ends of the sleeve shaft, a first driven shaft journaled in said sleeve shaft, a second driven shaft journaled in said sleeve shaft in axially spaced relationship with respect to said first driven shaft, the driven elements of the respective clutch assemblies being respectively mounted on said first driven shaft and second driven shaft, said driving elements of said first clutch assembly having means defining a chain drive assembly for connection with a power source to drivingly rotate said driving elements of said first clutch assembly, said sleeve shaft being rotated responsive to rotation of said driving elements of said first clutch assembly to drivingly rotate the driving elements of said second clutch assembly, and means defining separate clutch controller elements for each clutch assembly and respectively slidably mounted on said sleeve shaft between said first and second clutch assemblies in the space defined by the axially spaced relationship of the respective driving elements of said first and second clutch assemblies, said separate controller members including means for independently and individually and separately controlling respectively said first and second clutch assemblies responsive to manual manipulation by the operator to facilitate operation of either one or the other or both of said clutch assemblies.

2. A drive mechanism and controls therefor: a first disc-type clutch assembly having as a component part thereof a sprocket element; a second disc-type clutch assembly disposed in spaced relationship with respect to said first disc-type clutch assembly; each of said clutch assemblies comprising friction plates, clamping plates engaging the opposite sides of friction plates, a drive shaft, a first hub keyed to said drive shaft, one of the clamping plates being mounted on said hub and the other clamping plate floating axially relative to the hub mounted clamping plate but rotating therewith, a driven shaft in journaled relationship with said drive shaft, a second hub keyed to said driven shaft, said friction plates being carried by portions of one of said clamping plates and said second hub, an annular ring member mounted on the floating clamping plate, a collar axially movable on said drive shaft, over center locking shift levers pivotally connected to said collar with a free end of said levers being in intimate contact with said ring, said drive shaft being common to said first and second clutch assemblies and driven by the driving elements of the first clutch assembly to drive the driving elements of said second clutch assembly; and separate clutch control means in close association with each other and positioned intermediate said clutch assemblies with portions thereof carried by said drive shaft, said separate clutch control means being individually operable and alternatively and simultaneously connected to a respective axially movable collar of each clutch assembly for alternatively and simultaneously controlling operation of said clutch assemblies.

3. In a driving mechanism and controls therefor: a housing for said driving mechanism; means defining a rotatable sleeve shaft; a driven shaft journaled in and supporting said sleeve shaft for relative rotation therebetween; a first disc-type clutch assembly having as a component thereof a sprocket element; a second disc-type clutch assembly disposed in axially spaced relationship with respect to said first disc-type clutch assembly; each disc-type clutch assembly comprising friction plates, first and second clamping plates engaging the opposite sides of the friction plates, a first hub keyed to said sleeve shaft, said first clamping plate being fixedly carried by said hub for rotation therewith, said second clamping plate being mounted on said hub for axial sliding movement, an annular ring member carried by said second clamping plate and axially slidable therewith, a second hub keyed to said driven shaft, and said friction plates being respectively carried by said first clamping plate and said second hub, clutch actuating means disposed in the space between said clutch assemblies and comprising a third hub carried by said sleeve shaft for respective axial sliding movement, a shifter ring member mounted on said third hub for relative rotation therebetween, a pair of rocker arms pivotally connected one to the other, one free end of said pivotally connected arms having an abutment arranged in intimate engagement with portions of said ring member, the other free end of said pivotally connected arms being pivotally connected to said third hub, and remote control linkage mechanism disposed in the space between said clutch assemblies and including a shifter yoke pivotally mounted to portions of said housing with portion thereof in engagement with said shifter ring; and the axial sliding movement of a respective second clamping plate of a respective clutch assembly to clamping engagement with respective friction plates being responsive to manual manipulation of respective remote control linkage effective to slide the respective shifter ring member and the respective third hub axially on said sleeve shaft effective to move the respective rocker arm abutment into engagement with portions of the respective ring member.

References Cited in the file of this patent

UNITED STATES PATENTS

| Number | Name | Date |
|---|---|---|
| 698,112 | Hall | Apr. 22, 1902 |
| 891,267 | Lafaelle | June 23, 1908 |
| 971,364 | Duitch | Sept. 27, 1910 |
| 1,211,538 | Burtt | Jan. 9, 1917 |
| 1,560,098 | Powers | Nov. 3, 1925 |
| 1,734,718 | Donald | Nov. 5, 1929 |
| 1,779,583 | Blydenburgh | Oct. 28, 1930 |
| 1,880,344 | Franco | Oct. 4, 1932 |
| 1,940,947 | Hand | Dec. 26, 1933 |
| 1,971,380 | Pearmain | Aug. 28, 1934 |
| 2,055,724 | Irgens | Sept. 29, 1936 |
| 2,361,190 | Gerst | Oct. 24, 1944 |
| 2,401,796 | Raitch | June 11, 1946 |
| 2,429,378 | Stuebner | Oct. 21, 1947 |
| 2,549,078 | Gerst | Apr. 17, 1951 |